April 25, 1939.　　F. D. PFENING ET AL　　2,156,162
AIR CONDITIONING APPARATUS
Filed Dec. 19, 1936　　3 Sheets-Sheet 3
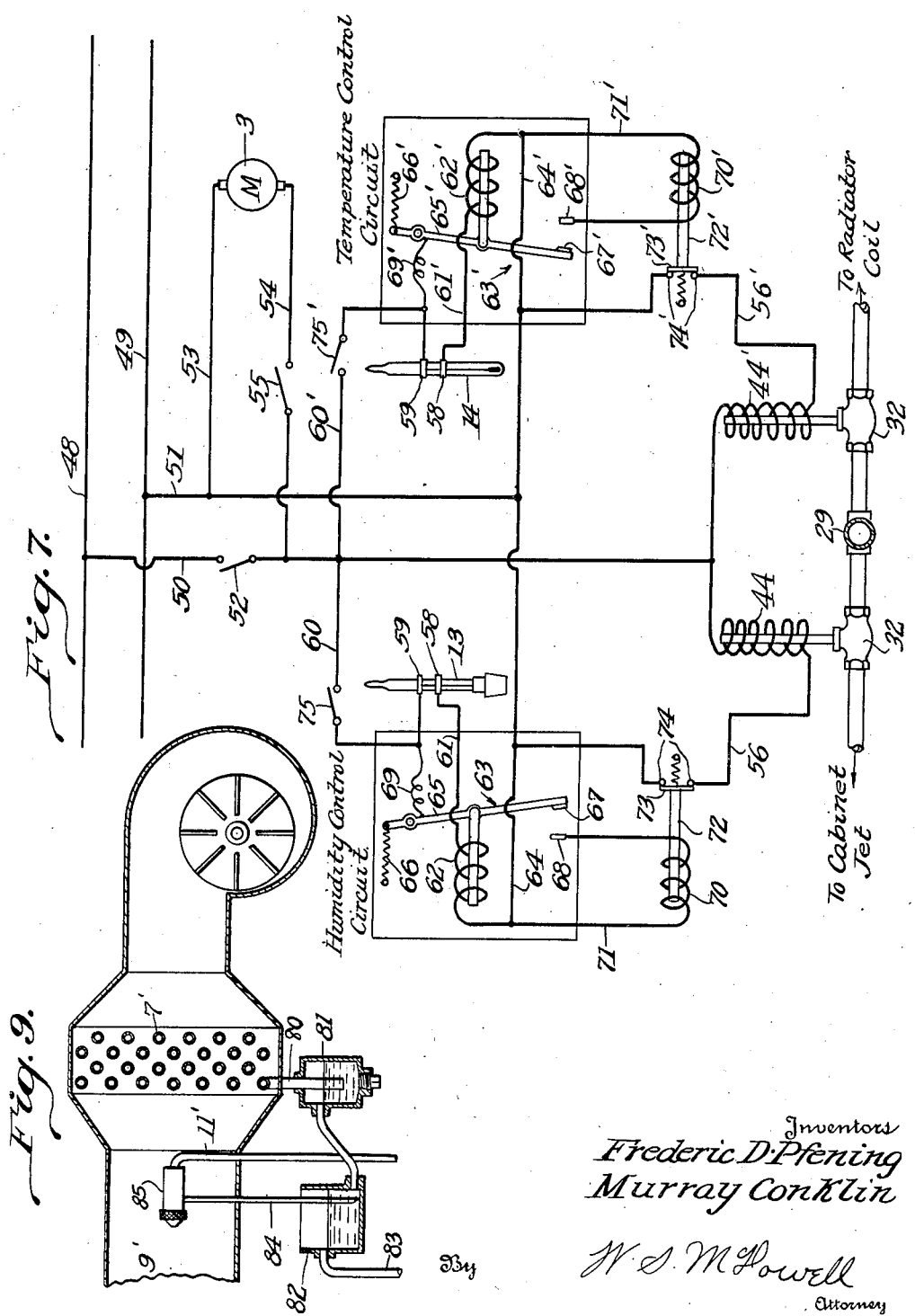

April 25, 1939.　　F. D. PFENING ET AL　　2,156,162
AIR CONDITIONING APPARATUS
Filed Dec. 19, 1936　　3 Sheets-Sheet 2
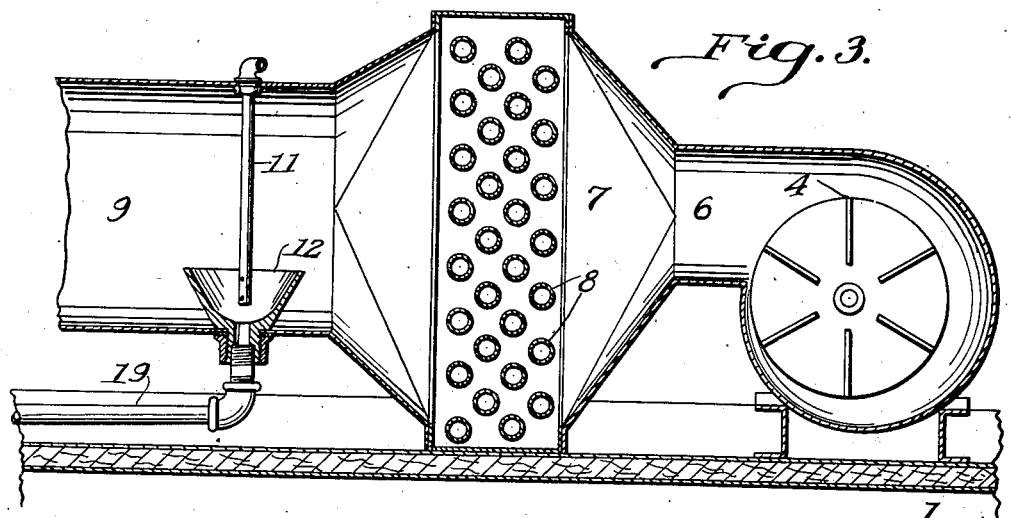
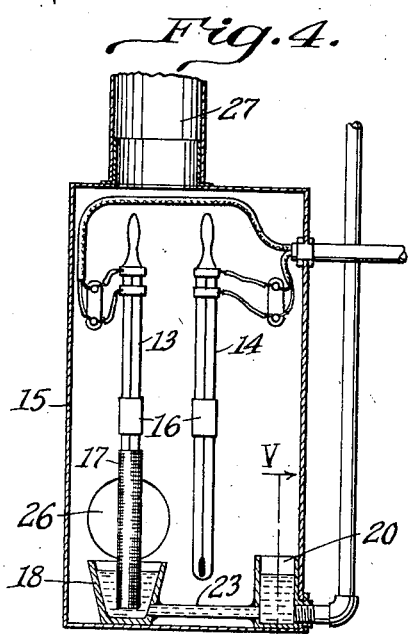
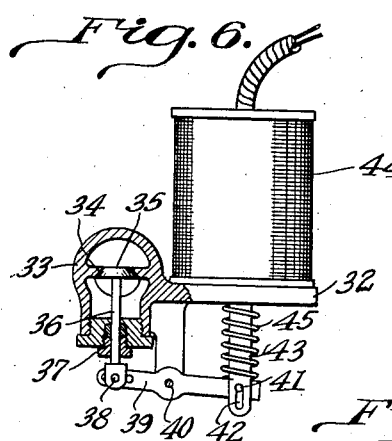
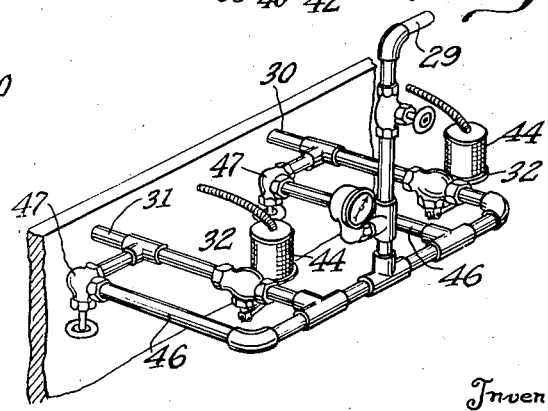
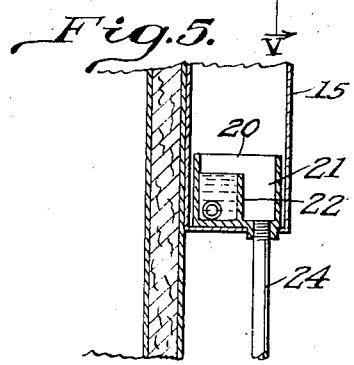
Inventors
Frederic D. Pfening
Murray Conklin
By W. S. M. Howell
Attorney April 25, 1939.  F. D. PFENING ET AL  2,156,162
AIR CONDITIONING APPARATUS
Filed Dec. 19, 1936  3 Sheets-Sheet 1

Inventors
Frederic D. Pfening
Murray Conklin
By W. S. McDowell
Attorney

Patented Apr. 25, 1939

2,156,162

UNITED STATES PATENT OFFICE 2,156,162

AIR CONDITIONING APPARATUS

Frederic D. Pfening and Murray Conklin, Columbus, Ohio, assignors to The Fred D. Pfening Company, Columbus, Ohio, a corporation of Ohio Application December 19, 1936, Serial No. 116,733

5 Claims. (Cl. 236—44)

This invention has particular reference to air conditioning apparatus, especially apparatus wherein the relative humidity and temperature prevailing within the atmosphere of a room or other enclosed structure are automatically maintained within close predetermined limits through the employment of novel automatic controls. While the present invention has many practical applications, such as its use in controlling atmospheres employed in the treatment of tobacco, textiles, lumber, testing rooms or in other purposes where carefully regulated atmospheres are required to serve industrial and other uses, its features are particularly exemplified and found useful in the baking industry.

In the baking of bread in modern commercial bakeries, dough bodies of appropriate size and weight are placed in pans which are transferred to an area known as the "proofing" room. In this room, the dough raises, filling the pans and assuming approximately normal loaf shape, so that after being in the proofing room for a period of time, the pans containing the raised dough may be transferred to ovens for final baking.

In the proofing room, it is important that substantially constant conditions of relative humidity and temperature be maintained in order to secure exactness in bread manufacture, for instance a temperature of 98° F. and a relative humidity of approximately 83%, with but minor variations from these predetermined conditions. Such precise conditions are obviously very difficult to maintain under all external weather conditions, such as fluctuating atmospheric temperatures and accompanying wide variations in relative humidity.

It is therefore the outstanding object of the present invention to provide simple, efficient and automatically operating means, utilizing steam and heat derived therefrom for maintaining the desired conditions of temperature and relative humidity of the atmosphere comprising the bakery proofing room or other enclosed area, the apparatus being under full automatic regulation and of such construction as to be sensitively responsive to the slightest variation in the condition of the atmosphere under regulation.

For a further understanding of the invention, reference is to be had to the following description and the accompanying drawings, wherein:

Fig. 3 is a vertical longitudinal sectional view on the plane indicated by the line III—III of Fig. 1;

Fig. 4 is a vertical sectional view of the cabinet containing the wet and dry bulb thermometers;

Fig. 5 is a detail vertical sectional view on the line V—V of Fig. 4;

Fig. 6 is a sectional view of one of the electrically operated steam controlling valves;

Fig. 7 is a diagrammatic view of the electrical circuits employed by the automatic controls.

Fig. 8 is a detail perspective view of the steam supplying pipes and their associated electrically and manually actuated control valves;

Fig. 9 is a detail sectional view disclosing modified apparatus for introducing water vapor into the air conditioning system.

Figure 1:
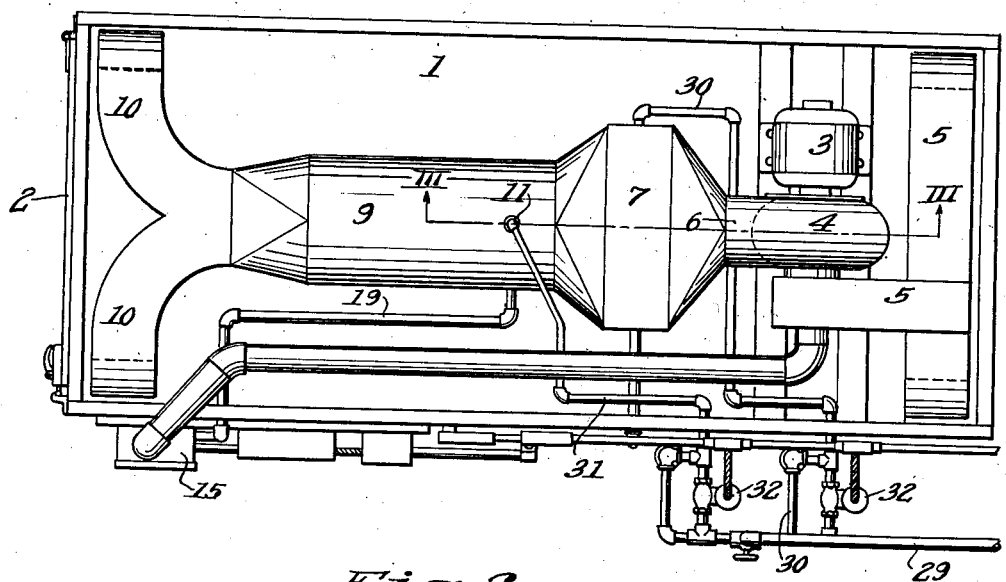
Fig. 1 is a top plan view of apparatus utilized in carrying out the present invention, and illustrating the same as arranged on the top of a bakery proofing box or room.
Figure 2:
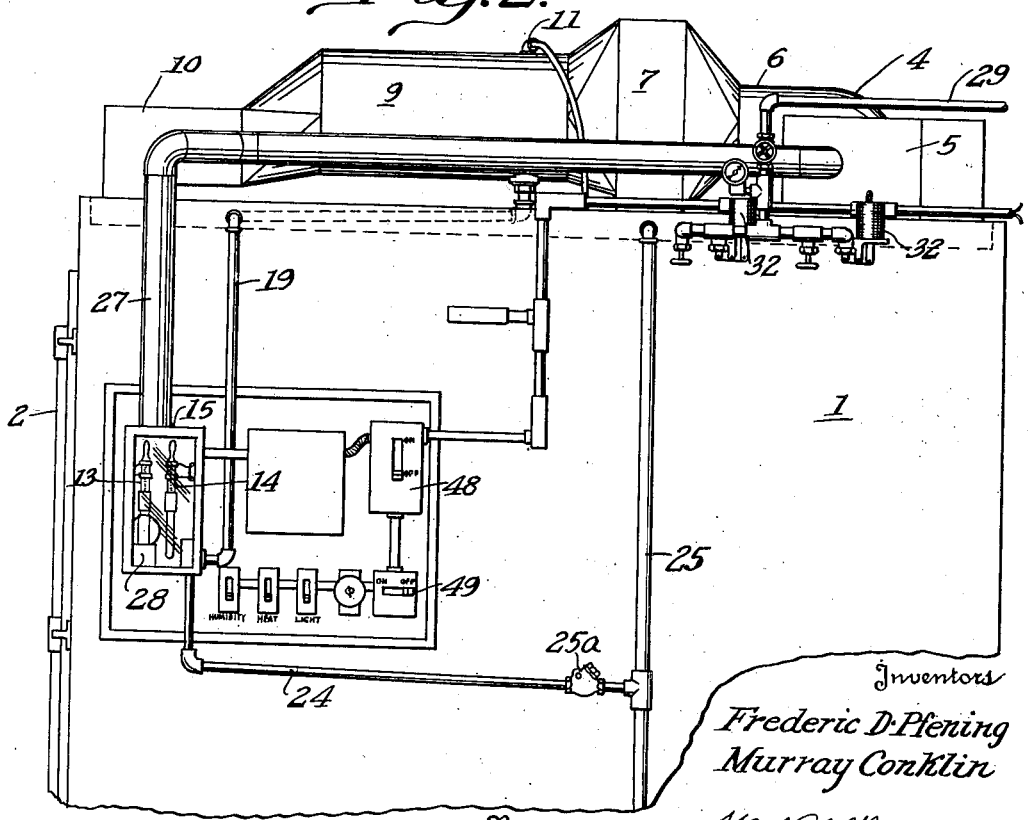
Fig. 2 is a side elevation of the proofing box or room and associated automatic controls for controlling the atmosphere thereof.

Referring more particularly to the drawings and to the specific embodiment of apparatus disclosed as exemplifying a useful form of the invention, the numeral 1 designates a room, box, casing or other enclosed area of suitable cubical capacity, the same being preferably provided with walls containing thermal insulation so that the interior of the enclosure may possess an atmosphere substantially independent of atmospheres prevailing around the exterior thereof. The front of the room, box or casing is provided with a similarly insulated hinged door 2, by which the interior of the room, box or casing is rendered accessible for the insertion or removal of bakery or other products into and from the same.

In this instance, there is mounted on the top of the ceiling of the room, box or casing an electric motor 3 which is employed to drive a fan or blower 4. Air withdrawn from the interior of the enclosed space is advanced by way of the ducts 5 to the inlet of the fan or blower, and thence, as shown in Fig. 3, is discharged through the outlet 6 of the fan or blower into a radiator section 7. Situated within this section are suitably spaced steam heated coils or pipes 8, and as the air under the positive action of the fan or blower is forced through the radiator section, it contacts with the exterior heated surfaces of the coils or pipes and has its temperature raised to a desired degree. The outlet of the radiator section is connected by means of a longitudinally extending duct 9 with laterally diverging forwardly disposed branch ducts 10 which lead to the interior of the room, box or casing 1 contiguous to the top of the latter. By this arrangement, heated air is delivered to the interior of the proof room, box or casing and continuously circulated therethrough, passing through the radiator section, thence through the room, box or casing and back to the radiator section. It will be understood that such air movement may be reversed in its described direction of flow.

Also disposed in the duct 9, immediately beyond the coils or pipes 8 is a steam inlet nozzle 11, the discharge end of which terminates within the confines of a condensate receiving cup 12. This is done for the duel purpose of catching condensate for forming a distilled water supply for the wet bulb thermometer, later described, and to prevent condensate which may accumulate in the jet supply line from going into the air stream as free water.

Steam or water vapor thus introduced in the duct 9 is caught up and held in suspension by the air flowing through the said duct and transferred to the interior of the box or casing 1, the automatic means, hereinafter described, being provided for controlling the passage of steam through the nozzles and also through the heating coils or pipes 8. A relative humidity of approximately 83% may thus be maintained throughout the interior of the box or casing 1 when the dry bulb temperature is maintained at 98° and the wet bulb temperature maintained at 93°. The bread dough undergoing proofing in said area absorbs the moistened heat so that the proofing operation is accelerated and the skin of the dough prevented from crusting.

In early prior apparatus, a proof or steam room was formed to comprise an uninsulated enclosed area with a steam pipe and a manually operated valve, dependence having been placed on the live steam for both heat and humidity; therefore, the relation of the heat and humidity was not correct and much poor quality bread resulted. Later, improvements were made by insulating the room and using a blower to circulate the air through a radiator for heat and the interior of the room and various means such as spray nozzles, open bodies of heated water and other imperfect means were used for securing relative humidity. This latter apparatus required circulating water pumps to operate the sprays or heating coils to keep the water in the open vessels warm, all of which caused considerable trouble and unsanitary conditions. In such earlier apparatus, automatic control of humidification was not maintained. While the factors of temperature and relative humidity are generally recognized, hitherto the art has not been supplied with a practical and reliable means for accurately and automatically maintaining the same with but slight tolerance. Attempts have been made, without success, to maintain the conditions through manually executed operations with and without the aid of temperature and humidity indicators. Attempts have been made to maintain dry bulb temperature with thermostatic valves and to regulate relative humidity manually, but without successful and desirable results.

To maintain a definite percentage of relative humidity, it is necessary to maintain a fixed, constant degree of dry bulb temperature. Our sensitive mercurial wet bulb and dry bulb thermostats actuated by the fluctuation of a fraction of a degree, enables us to hold the dry bulb temperature and the wet bulb temperature so closely that it gives us a definite percentage of relative humidity. Prior to our invention, this desirable feature was unavailable. None of the methods hitherto employed have been successful to the degree desired, and so far as we are aware, until the development of the present invention actual automatic control and regulation of relative humidity has been unattained in proofing room and other analogous operations. We have found, however, and experience has demonstrated, that with the aid of improved automatic controls herein provided, the atmospheric conditions in the proofing room can be uniformly maintained in the exacting manner desired. This control has been accomplished primarily through the provisions of the wet and dry bulb thermometers 13 and 14 and associated apparatus.

Heretofore, live steam has not been successfully used as a humidifying means. Steam at five pounds gauge pressure has a temperature of 227.2° F. and at fifty pounds gauge pressure, a temperature of 297.7° F. This prior manner of releasing live steam at various pressures for humidifying purposes in proofing rooms has caused the sensible heat to bring the dry bulb temperature of the proofing room to a high injurious degree. One reason for this is that the earlier controlling means of ejecting steam caused what is known as an "over-ride," thus building up the dry bulb temperature and over-humidifying, causing condensation of water in the proofing room. Our sensitive thermostats control the flow of steam to the radiators for producing temperature and to the steam nozzles or jets for producing humidity so closely that the undesirable features heretofore encountered are obviated.

Another improvement in our invention resides in the manner and quantity of live steam released for humidification. This provides a cooling effect through the principle of rapid evaporation of moisture which counteracts the tendency to increase the dry bulb temperature beyond that which is desirable. For every pound of water evaporated in the form of steam, 971 B. t. u. of heat are extracted from the sensible temperature, which deficiency, if any, is supplied by the heat from the radiator. The relative humidity in the average bakery, outside the proofing room is usually low, probably not more than 50%, and since the doors of the proof room are constantly being opened and closed, thus admitting much relatively cool and dry air, it is necessary that a means be provided in the conditioning system of the proof room to supply adequate quantities of moisture to maintain the proper wet bulb temperature.

By reason of our close sensitive control means, we maintain a fine balance between the wet and dry bulb requirement inside the proof room and the relative humidity never reaches a point where condensation occurs. Even though the ambient or proof room exterior temperature may reach as high as 102° or more, we still maintain not more than 98° inside because of the large amount of steam required for humidification and the evaporative cooling effect of same which tends to hold down temperature rises and the sensible heat given up by said steam. However, if the evaporative cooling is too great, then the heating radiator supplies the needed heat.

As shown in Fig. 4, these thermometers, in the particular embodiment of the invention herein selected for illustration, are mounted within an insulated cabinet 15 secured to one of the walls of the room, box or casing 1 and maintained in a vertical position within said cabinet by holders 16. The lower or bulb end of the thermometer 13 is surrounded by a tubular wick 17, the lower portion of said wick being immersed in a body of distilled water contained within a receptacle 18. Distilled water is supplied to this receptacle by condensate obtained from the cup 12 in which the discharge end of the steam inlet nozzle 11 is disposed. Condensate flows from the bottom of the cup 12 through a pipe line 19 into the receiving compartment of the trap 20 which is mounted within the cabinet 15, the receiving trap being separated from the outlet chamber 21 of said trap by a vertical wall 22, which maintains a water level in the receiving compartment of the trap corresponding with the water level within the receptacle 18, the latter being connected with the receiving compartment of the trap by means of a horizontal pipe 23. The outlet chamber of the trap is connected by means of a drain pipe 24 with the discharge pipe 25 leading from the steam heating coil 8, a check valve 25a being arranged within the drain pipe 24, preventing reverse flow therethrough. By this means, a predetermined water level is automatically maintained in the receptacle 18.

The interior of the cabinet 15 is in communication with the interior of the box or casing 1 by way of the opening 26 formed in one of the walls of the room or casing so that the atmosphere under regulation will constantly flow through the cabinet 15 and across the surfaces of the thermometers 13 and 14. The top of the cabinet is connected with a duct 27 by which the air introduced into said cabinet from the room or casing is continuously removed therefrom and transferred to the inlet side of the blower or fan 4, the latter being in constant operation while the proofing room or casing is being used. The front of the cabinet 15 is preferably provided with a glazed door 28, permitting the thermometers to be observed from the exterior of the apparatus.

It is through the sensitive functioning of the wet and dry bulb thermometers that the desired exacting control is obtained of the unusual atmospheric conditions which exist within the proof box, room or casing 1 during use thereof. These thermometers act as switches in the opening and closing of associated electrical control circuits, which are utilized to govern the operation of valves of the type disclosed in Fig. 6. Steam at a suitable temperature is delivered to the apparatus through the main 29. From this main a branch 30 leads to the heating coil or pipe 8 of the radiator section, while a second branch 31 extends to the steam inlet nozzle 11. Each of these branches contains an electromagnetically actuated valve 32 for governing the steam flow therethrough.

As shown in Fig. 6, each of these valves comprises a body 33 containing a port 34 which is opened or closed by a valve head 35, the latter being provided with a stem 36 which extends through the bottom of the valve and a packing gland 37 carried thereby. The lower end of the stem 36 is pivotally connected as at 38 with one end of a lever 39 pivotally mounted intermediately of its ends as at 40. The other end of the lever 39 is provided with a pin 41 which is received within an elongated slot 42 provided in the lower end of a solenoid armature 43. Connected with the valve body is a coil 44 of a solenoid and it will be seen that when said solenoid coil is energized, the valve head 30 will be moved to open the port 34 providing for the passage of steam through the branch 30 or 31 in which the valve is situated. A spring, as shown at 45, may be used for normally maintaining the valve head 35 in its position of closure when the solenoid coil is unexcited. If desired, shunt pipes 46 may be connected with the steam main 29 and the branches 30 and 31 thereof around the magnetically operated valves. These shunt pipes may be equipped with hand valves 47 so that in periods of emergencies, steam may be admitted to the heater coils or pipes 8 and/or to the nozzle 11 without the use of the automatic control mechanism.

The operation of the apparatus may best be understood by reference to Fig. 7, wherein numerals 48 and 49 indicate electrical power lines. From these lines extend branch conductors 50 and 51, a main switch 52 being arranged in the conductor 50 adjacent the power lines. A lead 53 connects one terminal of the fan motor 3 with the conductor 51 and the other terminal of the motor is connected by a corresponding lead 54 with the other branch conductor 50. A manually operated switch 55 is positioned in the lead 54 to control the operation of the fan motor. When the switches 52 and 55 are closed, current will flow from the power lines through the conductors 50 and 51 and the leads 53 and 54 to the motor causing it to drive the blower 4 to circulate air through the proof box. This circulation is constantly maintained by continuous operation of the fan motor during active use of the proofing box.

When the switch 52 is closed, current also flows to the coils 44 and 44' of the electrically actuated humidity and heat controlling valves 32 causing the valves to open to supply heat and moisture to the box. One end of each of the coils 44 and 44' is connected with the branch conductor 50 while the other end is connected with the other branch conductor 51 by lines 56 and 56'.

Since the demand for heat may occur at a different time period than the need for humidity, two separate circuit are provided; one for automatically operating the humidity control valve and the other for causing automatic operation of the heat control valve. The circuits above mentioned each include a thermally actuated switch which is formed by providing the thermometers 13 and 14 with spaced contacts 58 and 59, the contact 58 being normally engaged by the mercury of the thermometer. When the mercury rises sufficiently to engage the contact 59, current may then flow through the thermal switches.

The contacts 59 of the thermal switches are connected by wires 60, 60' with the branch conductor 50 and the contacts 58 of these switches are connected by lines 61, 61' with the field coils 62, 62' of magnetic relay switches 63—63'. The opposite sides of the coils 62, 62' are connected by lines 64, 64' with branch conductor 51. When the mercury columns in the thermometers rise and engage the contacts 59, current will flow through the coils 62—62' which will cause the armatures 65—65' of the switch 63—63' to move in opposition to the springs 66—66'. This action will move contacts 67—67', carried by the armatures, into engagement with stationary contacts 68—68' and current will then flow from conductor 50 over wires 60—60' through leads 69—69' to armatures 65—65', through the contacts 67—67', 68—68' to primary field coils 70—70' and back to conductor 51 by way of lines 71—71'.

The flow of current through coils 70—70' results in the attraction of spring pressed cores 72—72'. These members support at their outer ends bridge members 73—73' which normally engage spaced contacts 74—74' positioned in lines 56—56'. When the members 73—73' are moved away from the contacts 74—74', current flow to the coils 44—44' will be discontinued and the springs in valves 32 will cause the valve heads to obstruct the ports and stop the flow of steam to the heater and the cabinet jet.

When the mercury in the thermometers drops below a predetermined point, the flow of current to the coils 62—62' will be interrupted and the armatures 65—65' will move away from contacts 68—68', thus arresting current flow to the coils 70—70' and permitting the cores 72—72' to return to their normal position where bridge members 73—73' will complete the circuits to the coils 44—44' to again open valves 32.

It will be understood that the humidity control circuit is entirely separate from the temperature control circuit and each may operate independently of the other.

Manually operated switches 75—75' are positioned in lines 60—60' to provide means for interrupting current flow to either circuit as desired.

The electromagnetic switch represented by the coil 62 requires but a small amount of current to effect its operation so that a current of but small electrical value will pass through the thermometer 13. The switch including the armature 65 and coil 70, on the other hand, is of more rugged mechanical construction and will withstand higher voltages and amperages than the thermometer controlled switch. This construction provides for sensitivity in operation, long life and durability on the part of the switch mechanism.

As stated before, it is important to maintain both wet bulb and dry bulb temperature at a fixed relative degree if a definite percentage of relative humidity is to be maintained. If the wet or dry bulb temperature setting is changed, the relative humidity will vary accordingly. Because of this established and recognized principle, we provide a means for varying the percentage of relative humidity by sliding the wicking on the wet bulb thermometer up or down. When the wicking is moved to a position where less of the bulb is in contact with the wick, there occurs less evaporation of moisture from the absorbent wick and therefore correspondingly lower evaporative cooling effect. This causes a reduced flow of steam admitted through jet 11 thereby lowering the percentage of relative humidity. Also by raising the wick in greater contact with the bulb, the evaporative cooling or wet bulb depression is greater and holds the mercury out of contact with the terminal 59 and causes more steam to be admitted through jet 11, therefore raising the percentage of relative humidity. This provides a means of relative humidity adjustment and when once adjusted will automatically maintain this position. This is accomplished by establishing a false wet bulb temperature.

The present invention thus affords simple and automatically operated means for positively maintaining within close predetermined limits relatively high temperatures and a high percentage of relative humidity in the atmosphere of an enclosed area such as the proofing room of a bakery and other industrial applications. The apparatus when thrown into operation functions automatically but if anything should interfere with the automatic operation, the entire system or any part thereof may be operated under manual regulation. All the parts of the apparatus are readily accessible so that repairs, adjustments or replacements may be made quickly and with facility. The operation of the actuating thermometers and additional wet and dry bulb reading thermometers may be observed through the glass front wall of the cabinet 15, through which the wet and dry bulb thermometers may be readily viewed. Thus any variation in the position of the mercury columns of such thermometers, beyond the range of a degree or fraction thereof would indicate abnormal conditions. The air conditioning control apparatus may be employed in connection with proofing rooms of any desired dimensions or proofing capacity and due to the extremely compact form of the air conditioning control apparatus, it requires little or no extra room over that normally taken up by the proofing room.

It will be observed that the wet and dry bulb thermometer switches are located outside of the room or other enclosed area under control but, of course, are in communication with the atmosphere of said room or area through the air return duct in which the switches are situated. The present invention provides a constant and properly controlled flow of air at definite velocities over the bulbs of the thermometer switches, in order to afford accurate readings or operation thereof. Usually, maximum wet bulb depression cannot be obtained unless a definite amount of air per minute is passed over them, this being approximately at the rate of 600 ft. per minute. The operation of the fan motor and the size of the return duct are regulated in proportion to obtain this fixed velocity.

In Fig. 9 of the drawings, a modification has been disclosed, setting forth a variation of the humidifying nozzle for introducing moisture into the room area under regulation. In this figure, the air heater or radiator is shown at 7', and connected to the bottom of the element 7' is a pipe line 80 containing a sediment trap 81. The line 80 extends to a vessel 82 which receives the condensate from the heater or radiator 7'. A definite water level is maintained within the vessel 82 by means of an overflow pipe 83. Extending upwardly from the vessel 82 is a pipe 84 which terminates within an aspirating nozzle 85, live steam being supplied under pressure to said nozzle by way of the pipe line 11'. By this means, condensate from the vessel 82 may be introduced into the air stream passing through the duct 9' to supplement the water vapor introduced by the use of steam.

What is claimed is:

1. In apparatus of the character described, a blower, an air supplying and conditioning duct leading from the discharge side of said blower into the interior of an enclosed room, an air return duct leading from said room to the inlet side of said blower, independently operating wet and dry bulb thermometric circuit controllers arranged in said return duct, a steam admitting device and heater arranged in the air conditioning and supply duct, steam supplying means for said heater and said steam admitting device, electro-responsive valves for governing the flow of steam from said supply means to said heater and admitting device, and circuits for said valves opened and closed by said thermometric controls, and means for operating said blower to advance air withdrawn solely from said room at a constant predetermined velocity over the circuit controllers.

2. Air conditioning and reconditioning apparatus for automatically governing the atmospheres of enclosed rooms comprising a motor driven blower, a supply duct leading from the discharge side of said blower to the interior of the enclosed room, a return duct leading from the interior of the room to the inlet side of said blower, a steam heated radiator disposed in said supply duct, a steam admitting nozzle entering said supply duct, a source of steam supply, pipe lines leading from said source of steam supply to the radiator and steam inlet nozzle of said supply duct, an electrically operated valve arranged in each of said pipe lines, independently operating wet and dry bulb thermometric circuit controls disposed in said return duct, said controllers being operative to open and close primary circuits, and secondary circuits opening and closing in unison with the primary circuits, said secondary circuits having included therein said electrically actuated valves.

3. Temperature and humidity regulating apparatus for the atmosphere of an enclosed room comprising: conduit means for effecting a positive circulation of air into and from such a room, a motor driven blower arranged in said conduit means, a source of steam supply, a heater and a steam admitting device arranged in said conduit means and said enclosed room, pipes uniting the source of steam supply with said heater and steam admitting device, electrically actuated control valves disposed in said pipes, wet and dry bulb thermometric circuit controllers in communication with the atmosphere of said enclosed room and automatically operative to control the opening and closing of said valves, said wet bulb controller including a wick, a receptacle in which the lower portion of said wick is positioned, and means for supplying said receptacle with condensate obtained from the system and maintaining a predetermined level of the condensate within the receptacle.

4. Apparatus for obtaining predetermined humidity and temperature regulation of room atmospheres comprising a mercury column thermometer, spaced sets of stationary contacts carried by said thermometer with one of the contacts in constant engagement with its mercury column and the other of said contacts engageable with said column upon its predetermined expansion, a normally closed vapor flow controlling valve having a movable stem, a solenoid coil operable when energized to actuate said stem to effect the opening of said valve and thereby permit the flow of heated vapor through a pipe line connected therewith, a primary circuit in which said solenoid coil is situated, a normally open secondary circuit joined with the primary circuit and connected with the contacts of said thermometer, a relay in said secondary circuit, a normally open tertiary circuit joined with said primary circuit, a switch in said tertiary circuit operated by said relay, said tertiary circuit being completed by the operation of the relay in the secondary circuit when the latter is energized upon the mercury column in said thermometer bridging and electrically uniting said contacts, an electro-responsive relay means in said tertiary circuit, and a switch in said primary circuit operated by said relay means and operative to normally close said primary circuit and effect the opening of the latter when said tertiary circuit is closed.

5. Apparatus for maintaining predetermined temperature and humidity conditions of the atmosphere of a chamber adapted for the reception of bakery products, comprising an externally positioned duct system including a motor driven fan for withdrawing air from one portion of such a chamber and delivering conditioned air into another portion of said chamber, a steam-heated radiator in said duct system, a nozzle for disseminating steam directly into the air passing through said duct system, steam supply pipes leading to said radiator and nozzle, solenoid valves controlling the flow of steam through said pipes to the radiator and nozzle, a branch duct leading from said chamber to the suction side of said fan and through which duct spent atmosphere only of said chamber is passed, independently operating wet and dry bulb mercury tube thermometric switches positioned in said duct and over which the discharged atmosphere only of said chamber is passed at a substantialy constant velocity maintained by said fan, and electrically energized circuits governed by said switches for opening and closing said solenoid valves in accordance with the heat and humidity demands of the air passing through said duct system.

FREDERIC D. PFENING.
MURRAY CONKLIN.